June 10, 1958 R. E. NUGENT 2,838,654
SELECTIVE CONTROL DEVICE FOR STABILIZED INERT
GAS SHIELDED ARC WELDING SYSTEMS
Filed Oct. 22, 1957
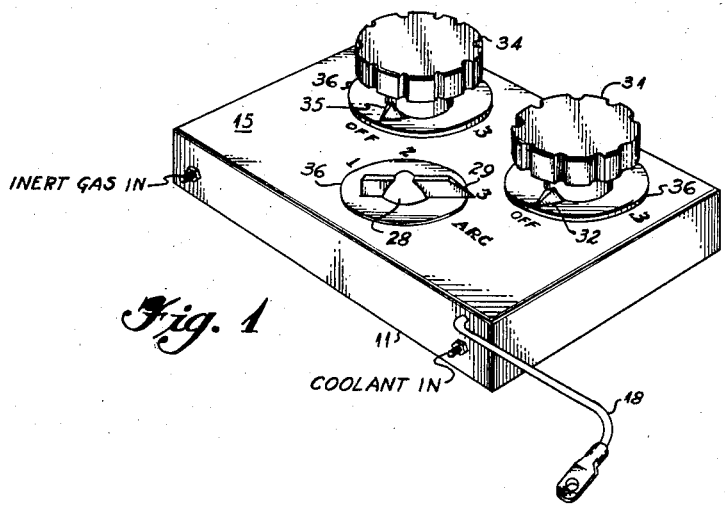
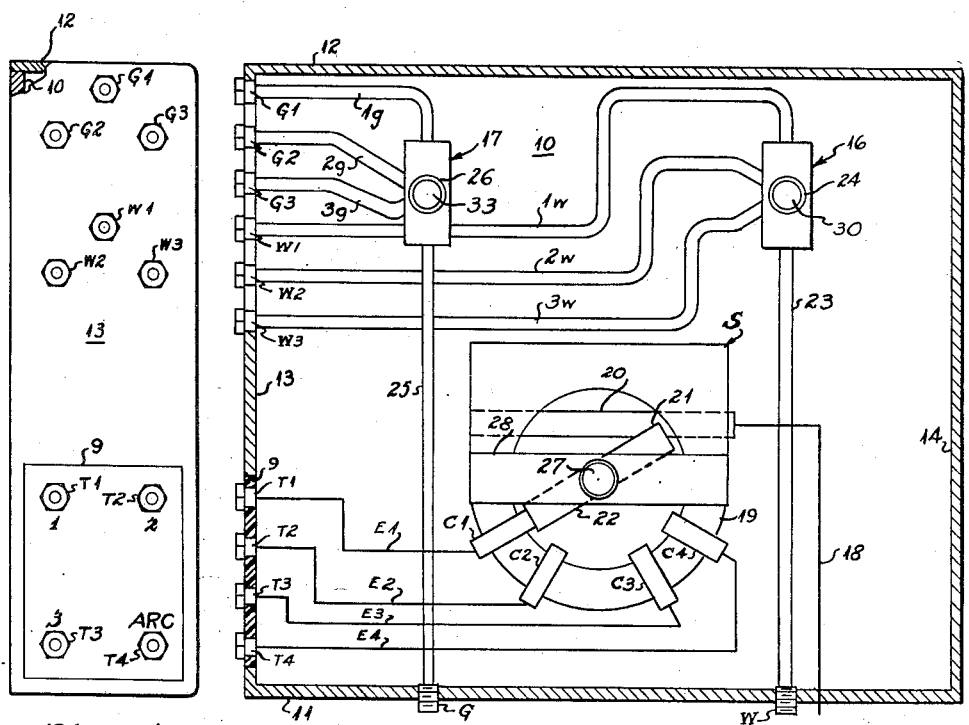
INVENTOR.
Ralph E. Nugent
BY Sellers and Latta
ATTORNEYS

United States Patent Office 2,838,654
Patented June 10, 1958

2,838,654

SELECTIVE CONTROL DEVICE FOR STABILIZED INERT GAS SHIELDED ARC WELDING SYSTEMS

Ralph E. Nugent, North Hollywood, Calif.

Application October 22, 1957, Serial No. 691,667

4 Claims. (Cl. 219—130)

This invention relates to arc welding apparatus and in particular to welding apparatus providing for connections to a number of torches including at least one metallic welding torch (non-shielded) and several torches provided with inert gas connections for shielding their arcs. It is quite common for example to have three or more torches all connected at the same time to the welding current terminal of an electric arc welding apparatus, but an operator can use only one torch at a time. Nevertheless, all torches thus connected to the welding current function as radio energy radiating antennae and will all radiate radio energy which is received in neighboring radio receivers as interference or "static." Three times as much interference will be radiated by three torches as by a single torch.

With the foregoing in mind, the general object of my invention is to provide a control device for use with a multiple torch welding apparatus, to control and reduce extensive radio interference generated in such welding apparatus.

More specifically, the invention aims to provide a control device which can be connected into any standard welding apparatus between the torches and the remainder of the apparatus and which can be operated to selectively energize a single torch while rendering all other torches inoperative and disconnected from the welding current terminal of the apparatus.

A further object is to provide a control device which provides for selectively connecting any one torch to the welding current, to the inert gas supply, and to a supply of water for cooling, for selectively distributing current, gas and coolant water to the selected torch.

Toward the attainment of these objects, the invention provides an improved control device embodying a new and novel arrangement and combination of parts as hereinafter more fully described and disclosed in the accompanying drawings, wherein:

Fig. 1 is a perspective view of a control box embodying the invention;

Fig. 2 is an end view of the same; and

Fig. 3 is a combined plan view and schematic diagram of the control box broken away and shown in cross section.

Referring now to the drawings in detail, I have shown therein, as an example of one form in which the invention may be embodied, a control device in the form of a box which may embody a back panel or bottom 10, a cover comprising front and rear sides 11 and 12, ends 13 and 14, and a front or top wall 15. Alternatively, the lateral walls 11, 12, 13, 14 could be a part of the back panel 10.

These parts provide a casing for the operative mechanism of my control device, which in general, comprises a selector switch S for selectively directing welding current to any one of a plurality of torch terminals T1, T2, T3, and T4; a selector water valve 16, for selectively directing water to either of three water delivery fittings W1, W2, and W3; and a selector gas valve 17 for selectively directing inert gas to any one of three gas delivery fittings G1, G2, and G3 respectively. Welding current is delivered to selector switch S by a conductor 18 entering the casing through the front side 11 as shown in Fig. 1. Conductor 18 is shown schematically in Fig. 3. The terminals T1, T2, T3 and T4 are mounted in an insulator terminal block 9 which in turn is mounted in the end wall 13 of the casing. Gas terminals G1, G2 and G3, and water terminals W1, W2 and W3 are suitably mounted in the same end wall 13, so that all torch connections may be made to the one end of the control box.

Switch S comprises a ring body 19 mounting a flat bar contact 20 against which a brush 21, formed as an integral continuation of a wiper finger 22, is in constant contact, sliding against the bar 20 as the wiper finger 22 is rotated to bring it selectively into engagement with contacts C1, C2, C3 and C4 of the switch, mounted around a semi-circumference of the ring body 19. These contacts are connected by short conductor wires E1, E2, E3 and E4 respectively within the casing, to the respective terminals T1, T2, T3 and T4.

Water is delivered to valve 16 from a water source connection W mounted in the front side 11 of the casing, and through a tube 23 extending from fitting W to the valve in the casing. The valve 16 may be any standard multiple outlet valve with three outlet ports adapted to be selectively connected through a valve rotor 24 to an inlet port connected to tube 23. From the respective outlet ports, water is transferred to the respective water delivery fittings W1, W2, W3 through respective tubes 1w, 2w, and 3w, each connected at one end to a respective outlet port and at its other end to a respective water fitting.

Gas is delivered to valve 17 from a gas fitting G through a tube 25 extending from fitting G through the casing to an inlet port of gas valve 17. Valve 17 may be of construction similar to valve 16 including three outlet ports adapted to be selectively connected to the inlet port through rotor 26 of the valve, depending upon the position of rotation of the rotor. Since the valves 16 and 17 may be of any conventional construction, the details thereof are not illustrated.

From the three outlet ports of valve 17, gas is transferred selectively through short tubes 1g, 2g, and 3g respectively to the respective gas fittings G1, G2 and G3 respectively.

Switch wiper 22 is mounted on a stem 27 which is suitably mounted for rotation, as by means of a bracket 28 attached to the face of ring body 19, and the stem 27 extends through the top or front wall 15 of the casing and has a selector button 28 attached to its projecting end. Button 28 embodies a pointer 29 which cooperates with indicator marks on top wall 15 (or of a dial plate 36) said indicator marks including the numerals "1," "2" and "3" and the word "arc" shown on the face of the cover as seen in Fig. 1. These indicator marks are correlated with the brush 22 to indicate engagement of the brush against contacts C1, C2, C3 and C4 respectively.

The rotor 24 of valve 16 has a stem 30 which extends through the top 15 of the casing and is provided with an actuator knob 31 secured thereto, and a pointer 32 for coaction with indicator marks including the numerals "1," "2," and "3" as well as the word "off" seen in Fig. 1, the "off" position being one in which rotor 24 cuts off the connection between its inlet port and all three of its outlet ports so as to shut off the supply of water.

The rotor 26 of the gas valve 17 has a stem 33 which extends through the top wall 15 and is provided with a knob 34 secured thereto and with a pointer 35 which cooperates with indicator marks such as the numerals "1," "2," and "3" as well as the word "off," the latter indicating a position in which rotor 26 cuts off the flow of gas from tube 25 to all 3 of the tubes 1g, 2g and 3g.

In connecting my improved control box into a standard arc welding apparatus, the fitting W is connected to the water supply connection of the apparatus, the fitting G is connected to the gas supply connection of the apparatus and the conductor 18 is connected to the main welding terminal of the apparatus. This terminal and the water connection and gas connection of the apparatus mentioned immediately above, are the connections to which the several torches and their water and gas connections are normally connected. My control box provides control apparatus interposed between these normal connections and the several torches and the individual connections of the several torches so as to cut off the connections to all torches except the one that is in use.

In the operation of my control panel, the operator simply sets the switch pointer 29, the water valve pointer 32 and the gas valve pointer 35 to a common indicator mark (e. g. the indicator mark "1" for each of the controls, or the indicator mark "2" or "3." By the setting on the mark "1" the number 1 torch will be connected to the welding current, to the water and to the gas respectively. Similarly, for a setting of each of the controls on the marks "2" or "3," the second or third torch will be connected to the current, water and gas connections respectively. In each case, all other torches are completely disconnected. If the operator desires to use the metallic arc welding torch, as in welding steel parts together without requiring the use of gas or water, he will set the switch pointer 29 to the "arc" position and will set the knobs 31 and 34 to the "off" position in each case, thus cutting off the gas and the water and connecting the fourth torch to the welding current.

It will be understood that my control box may be modified for a greater or less number of torches by utilizing a selector switch and valves having a greater or smaller number of positions and providing a correspondingly greater or smaller number of current terminals and water and gas connections respectively.

The apparatus does not incorporate a master switch for breaking the circuit between the selector switch S and the welding current. This is not necessary but instead, the master switch of the conventional welding apparatus is utilized for this purpose.

It will now be apparent that through the use of my control box, an operator can with the greatest of ease shift connections for welding current, gas and water from one torch to another by setting the three knobs of the control box to corresponding positions and can thus cut in one torch with its several functional connections while cutting out all other torches and thereby eliminating the majority of the radio interference commonly generated by welding apparatus.

I claim:

1. A control box adapted to be interposed between an arc welding apparatus having current, coolant and inert gas connections, and a plurality of welding torches, said control box comprising: a casing; a multiple position selector switch, a multiple position gas valve and a multiple position water valve disposed within said casing; a conductor entering said casing and connected to said selector switch for conveying welding current from a main terminal of said welding apparatus to said switch; a plurality of current delivery terminals for connection to respective welding torches mounted in insulated relation to one another in the wall of said casing, a plurality of corresponding selective contacts in said selector switch and a plurality of corresponding conductors connecting the same to the respective current delivery terminals within said casing; a plurality of water delivery fittings mounted in a wall portion of said casing and adapted to be connected respectively to coolant connections of respective torches, and a plurality of delivery tubes extending within said casing from respective selective outlet ports of said water selector valve to respective water delivery fittings; a plurality of gas delivery fittings mounted in a wall portion of said casing for connection to respective inert gas connections of respective torches, and a plurality of gas delivery tubes extending within said casing from respective selective outlet ports of said gas selector valve to respective fittings; said switch and each of said valves having respective rotor stems extending through the wall of said casing; respective knobs attached to the projecting outer ends of said stems and each provided with an indicator pointer; and respective indicator marks on said last mentioned wall of the casing for indicating corresponding positions of adjustment for said switch and each of said valves for setting the same in correlation to one another for selectively directing welding current, gas and water to a selected single torch while cutting off the current, gas and water connections to the other torches.

2. A control box adapted to be interposed between an arc welding apparatus having current, coolant and inert gas connections, and a plurality of welding torches, said control box comprising: a casing; a multiple position selector switch, a multiple position gas valve and a multiple position water valve disposed within said casing; a conductor entering said casing and connected to said selector switch for conveying welding current from a main terminal of said welding apparatus to said switch; a plurality of current delivery terminals for connection to respective welding torches mounted in insulated relation to one another in the wall of said casing, a plurality of corresponding selective contacts in said selector switch and a plurality of corresponding conductors connecting the same to the respective current delivery terminals within said casing; a plurality of water delivery fittings mounted in adjacent relation in a wall portion of said casing and adapted to be connected respectively to coolant conections of respective torches, and a plurality of delivery tubes extending within said casing from respective selective outlet ports of said water selector valve to respective water delivery fittings; a plurality of gas delivery fittings mounted in a wall portion of said casing in adjacent relation for connection to respective inert gas connections of respective torches, and a plurality of gas delivery tubes extending within said casing from respective selective outlet ports of said gas selector valve to respective fittings; said switch and each of said valves having respective rotor stems extending through the wall of said casing; respective knobs attached to the projecting outer ends of said stems and each provided with an indicator pointer; and respective indicator marks on said last mentioned wall of the casing for indicating corresponding positions of adjustment for said switch and each of said valves for setting the same in correlation to one another for selectively directing welding current, gas and water to a selected single torch while cutting off the current gas and water connections to the other torches.

3. A control box adapted to be interposed between an arc welding apparatus having current, coolant and inert gas connections, and a plurality of welding torches, said control box comprising: a casing; a multiple position selector switch, a multiple position gas valve and a multiple position water valve disposed within said casing; a conductor entering said casing and connected to said selector switch for conveying welding current from a main terminal of said welding apparatus to said switch; a plurality of current delivery terminals for connection to respective welding torches mounted in insulated relation to one another in a segregated group in a wall of said casing, a plurality of corresponding selective contacts in said selector switch and a plurality of corresponding conductors connecting the same to the respective current delivery terminals within said casing; a plurality of water delivery fittings mounted in a segregated group in a wall portion of said casing and adapted to be connected respectively to coolant connections of respective torches, and a plurality of delivery tubes extending within said casing from respective selective outlet ports of said water selector valve to respective water delivery fittings; a plurality of gas delivery fittings mounted in a wall portion of said casing in a segregated group for connection to respective inert gas connections of respective torches, and a plurality of gas delivery tubes extending within said casing from respective selective outlet ports of said gas selector valve to respective fittings; said switch and each of said valves having respective rotor stems extending through the wall of said casing; respective knobs attached to the projecting outer ends of said stems and each provided with an indicator pointer; and respective indicator marks on said last mentioned wall of the casing for indicating corresponding positions of adjustments where said switch and each of said valves for setting the same in correlation to one another for selectively directing welding current, gas and water to a selected single torch while cutting off the current, gas and water connections to the other torches.

4. A control box adapted to be interposed between an arc welding apparatus having current, coolant and inert gas connections, and a plurality of welding torches, said control box comprising: a support, a multiple position selector switch, a multiple position gas valve and a multiple position water valve mounted on said casing; a conductor connected to said selector switch for conveying welding current from a main terminal of said welding apparatus to said switch; a plurality of current delivery terminals for connection to respective welding torches mounted in insulated relation to one another on said support; a plurality of corresponding selective contacts in said selector switch and a plurality of corresponding conductors connecting the same to the respective current delivery terminals within said casing; a plurality of water delivery fittings mounted on said support and adapted to be connected respectively to coolant connections of respective torches; a plurality of delivery tubes extending from respective selective outlet ports of said water selector valve to respective water delivery fittings; a plurality of gas delivery fittings mounted on said support for connection to respective inert gas connections of respective torches; and a plurality of gas delivery tubes extending from respective selective outlet ports of said gas selector valve to respective fittings; said switch and each of said valves having respective actuators each provided with an indicator pointer; and respective indicator dials for indicating corresponding positions of adjustment for said switch and each of said valves for setting the same in correlation to one another for selectively directing welding current, gas and water to a selected single torch while cutting off the current, gas and water connections to the other torches.

No references cited.